(12) United States Patent
Kwak et al.

(10) Patent No.: US 10,063,482 B2
(45) Date of Patent: Aug. 28, 2018

(54) DISTRIBUTED SERVICE FUNCTION FORWARDING SYSTEM

(71) Applicant: ELECTRONICS AND TELECOMMUNICATIONS RESEARCH INSTITUTE, Daejeon-si (KR)

(72) Inventors: Ji Young Kwak, Gwangju-si (KR); Sae Hoon Kang, Daejeon-si (KR); Hyun Joo Bae, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 100 days.

(21) Appl. No.: 15/233,930

(22) Filed: Aug. 10, 2016

(65) Prior Publication Data

US 2017/0353387 A1 Dec. 7, 2017

(51) Int. Cl.
*H04L 12/803* (2013.01)
*H04L 12/801* (2013.01)
*H04L 12/721* (2013.01)

(52) U.S. Cl.
CPC ............ *H04L 47/125* (2013.01); *H04L 45/38* (2013.01); *H04L 47/18* (2013.01)

(58) Field of Classification Search
CPC ..... H04L 47/10; H04L 12/5602; H04L 29/06; H04L 47/27; H04Q 11/0478
See application file for complete search history.

(56) References Cited

U.S. PATENT DOCUMENTS

| | | | | |
|---|---|---|---|---|
| 7,684,330 B2 * | 3/2010 | Kadambi | ............ | H04L 12/4641 370/230 |
| 8,018,849 B1 * | 9/2011 | Wentzlaff | .......... | G06F 15/17337 326/41 |
| 8,989,009 B2 * | 3/2015 | Xiong | ................... | H04L 49/357 370/218 |
| 9,038,151 B1 * | 5/2015 | Chua | ...................... | H04L 45/02 709/223 |
| 9,264,301 B1 * | 2/2016 | Chua | ........................ | H04L 45/02 |
| 9,276,877 B1 * | 3/2016 | Chua | ........................ | H04L 45/02 |
| 2001/0025329 A1 * | 9/2001 | Sheikh | ................ | G06F 13/4022 710/113 |
| 2005/0141523 A1 * | 6/2005 | Yeh | ......................... | H04L 43/00 370/400 |
| 2013/0272305 A1 | 10/2013 | Lefebvre et al. | | |
| 2014/0269288 A1 * | 9/2014 | Crisan | ................. | H04L 47/2425 370/231 |

(Continued)

FOREIGN PATENT DOCUMENTS

KR 10-2014-0072343 A 6/2014
KR 10-2015-0058087 A 5/2015

*Primary Examiner* — Mark Rinehart
*Assistant Examiner* — Sanjay K Dewan
(74) *Attorney, Agent, or Firm* — Rabin & Berdo, P.C.

(57) ABSTRACT

Provided is a distributed service function (SF) forwarding system that applies the corresponding service function chain (SFC) to traffic classified by a plurality of service network (SN) controller instances based on an SN overlay structure. Therefore, by selectively combining and executing necessary network functions (SFs) according to a path and traffic made up of defined component services, it is possible to dynamically configure and control one network service.

9 Claims, 4 Drawing Sheets

(56) References Cited

U.S. PATENT DOCUMENTS

| | | | |
|---|---|---|---|
| 2015/0188820 A1* | 7/2015 | Anghel | H04L 47/115 370/235 |
| 2015/0188837 A1 | 7/2015 | Djukic et al. | |
| 2015/0195197 A1* | 7/2015 | Yong | H04L 45/74 370/392 |
| 2015/0319078 A1* | 11/2015 | Lee | H04L 12/6418 370/392 |
| 2016/0099864 A1* | 4/2016 | Akiya | H04L 45/28 370/216 |
| 2016/0134531 A1* | 5/2016 | Assarpour | H04L 45/74 370/392 |
| 2017/0230279 A1* | 8/2017 | Mozolewski | H04L 45/26 |
| 2017/0346752 A1* | 11/2017 | Krishnamurthy | H04L 47/34 |

\* cited by examiner

DISTRIBUTED SERVICE FUNCTION FORWARDING SYSTEM

CROSS-REFERENCE TO RELATED APPLICATION(S)

This application claims priority from Korean Patent Application No. 10-2016-0070426, filed on Jun. 07, 2016, in the Korean Intellectual Property Office, the disclosure of which is incorporated herein by reference in its entirety.

BACKGROUND

1. Field

The following description relates to service function (SF) chaining technology, and more particularly, to a distributed SF forwarding system.

2. Description of Related Art

US Patent Publication No. 2013/0272305 (Oct. 17, 2013) discloses a method and system for steering traffic through a service set. According to this technology, a service path or chain is assigned to a received packet based on a classification of the packet, and a direction and a location of traffic on the service path are determined before a previous service is applied to the traffic. Also, the next destination of the traffic is determined according to the assigned service chain and information on the determined location and direction.

To improve an existing static network service providing method in which service and network resources are not flexibly used because a service forwarding path is dependent on a network topology, the present inventor has researched a distributed SF forwarding technology for applying a service function chain (SFC) to traffic classified by a plurality of service network (SN) controller instances based on an SN overlay structure.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to a distributed service function (SF) forwarding system which applies a service function chain (SFC) to traffic classified by a plurality of service network (SN) controller instances based on an SN overlay structure to improve an existing static network service providing method in which service and network resources are not flexibly used because a service forwarding path is dependent on a network topology, thereby enabling dynamic configuration and control of one network service through selective combining and execution of necessary network functions in accordance with a path and traffic made up of defined component services.

In one general aspect, a distributed SF forwarding system includes: SN controller instances configured to control SNs of a network overlay structure in units of SFCs obtained by abstracting network functions necessary for a service and application sequences of the network functions, and generate service graphs which are service function paths (SFPs); and a software defined network (SDN) infrastructure controller including an SFC handling classifier function of mapping an SN capable of generating a service graph of an SFC requested for generated traffic to an SN controller instance to resolve a traffic bottleneck caused according to a location of an SFC classifier on which data traffic is concentrated and a number of instances.

In an additional aspect, when there is an SN appropriate for an SFC requested by traffic or a new SN is configured, the SDN infrastructure controller may include SFC-identification (ID) tag information in a request for an SFP of the traffic and transmit the request to an SN controller instance controlling the corresponding SN.

In an additional aspect, the SN controller instance may configure several SFPs by selectively combining ordered logical SF components.

In an additional aspect, the SN controller instance may generate the service graph according to an ordered SFP included in the SFC with reference to SF sequences.

In an additional aspect, when an amount of traffic generated in the SN exceeds a requested amount of network resources, the SN controller instance may distribute a generated traffic load by resetting multiple SFPs for the SFC according to a multipath forwarding method based on minimum costs dependent on currently available network resources.

In an additional aspect, when resetting a path of the service graph according to the SFC of the SN, the SN controller instance may apply the minimum costs-based multipath forwarding method, and distribute a part of generated traffic by selecting an SFP having the smallest number of SF instances constituting an ordered SFP from among a plurality of generated SFPs and setting a replacement path for the path or multiple paths.

In an additional aspect, when a processing overload occurs at a particular SF instance or the SF instance attains a failure state and it is not possible to support the requested SFP during a process of transmitting traffic generated on the SFP constituted by selectively combining ordered logical SF components of the SFC supported by the SN, the SN controller instance may provide an uninterrupted SFP function by copying a candidate SF instance capable of replacing the SF instance determined to be in the failure state, in consideration of currently available computing resources.

In an additional aspect, when it is determined that it is difficult to copy the SF instance in the failure state, the SN controller instance may determine whether SF instances currently in a stop state among SF instances running for an SFC supported by another SN are of a type capable of replacing a failed SF, and adjust a configuration of the SN to include a candidate SF instance capable of replacing the failed SF.

In an additional aspect, the SN controller instance may select the candidate SF instance for the failed SF from among SF instances included in the SFC of the other SN, in consideration of an increase in communication cost caused by a roundabout path of an SFP passing through the candidate SF instance.

In an additional aspect, when it is determined that it is not possible to select a candidate SF instance, the SN controller instance may select another SFC capable of supporting an SFP function related to the failed SF.

In an additional aspect, the SN controller instance may select the other SFC after determining whether there are available network resources and computing resources besides the plurality of SFPs currently running.

Other features and aspects will be apparent from the following detailed description, the drawings, and the claims.

Figure 1:
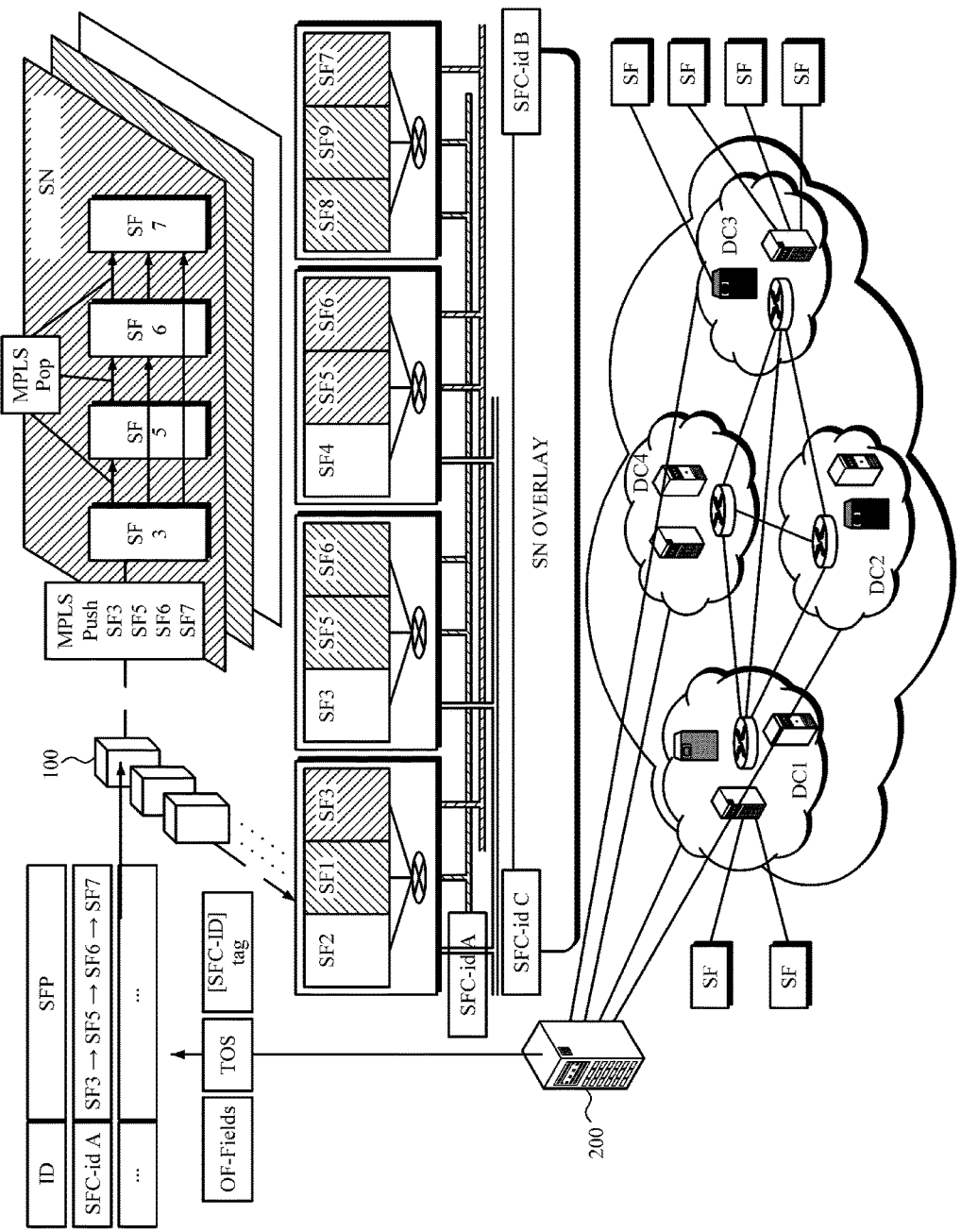
FIG. 1 is a diagram showing a configuration of a distributed service function (SF) forwarding system according to an exemplary embodiment of the present invention.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

Hereinafter, exemplary embodiments of the present invention will be described in detail with reference to the accompanying drawings such that those of ordinary skill in the art may easily understand and implement the present invention.

In the following description of the present invention, a detailed description of known art related to the present invention will be omitted when it may unnecessarily obscure the subject matter of the present invention.

The terms used in the following description are terms defined in consideration of functions in exemplary embodiments of the present invention and may vary depending on the intention of a user or an operator, practice, and so on. Therefore, definitions of terms used herein should be made based on the content throughout the specification.

Existing network functions are dependent on a topology. Therefore, it is difficult to apply various and flexible service policies according to attributes of traffic, and an operation of adding or changing existing network functions which have been installed in a hardware manner is highly complicated and dangerous.

A classification function is necessary to enable a service function chain (SFC), and a service classification function classifies packets according to a traffic classification standard.

A classifier present at a start location of an SFC to which a service graph is applied plays an important role, that is, the classifier classifies generated traffic so that the traffic may be forwarded to a service function path (SFP).

Various types of classifiers are necessary according to use and network environments. The number of instances of a used classifier and locations of the instances are directly connected to use of computing resources and service quality and thus are important issues.

Two purposes for minimizing the number of deep packet inspection (DPI) engines and minimizing network load are actually in a trade-off relationship, that is, the purposes are not simultaneously achieved. In practice, the flow of all traffic to be analyzed passes through at least one DPI engine. Therefore, when there are only a few DPI engines, a traffic path lengthens.

Figure 4:
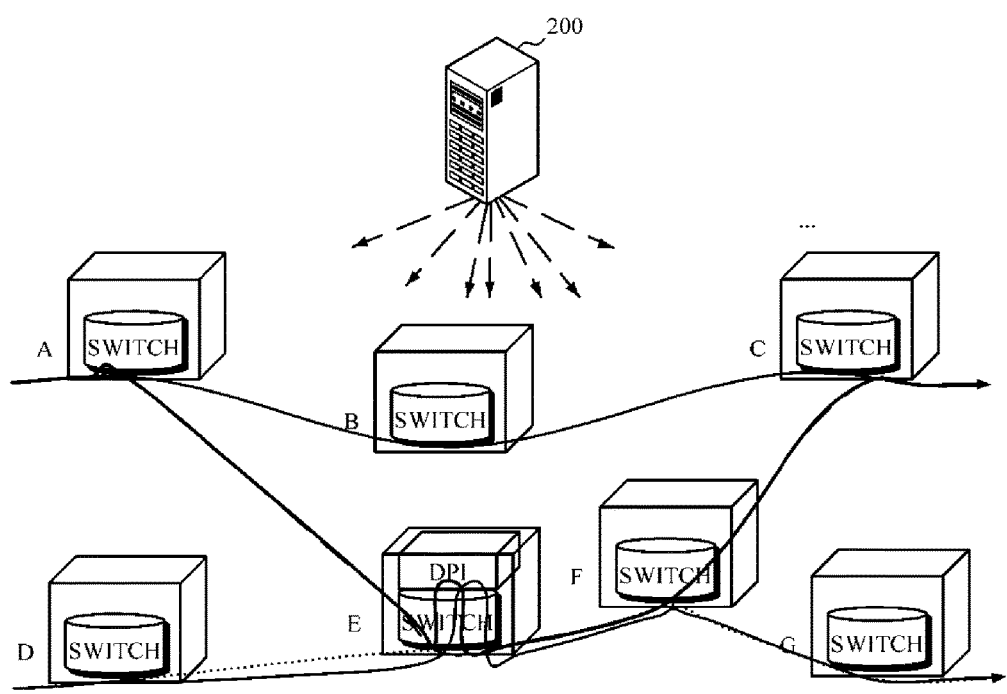
FIG. 4 is a diagram showing a generation of a traffic bottleneck and roundabout paths according to position of a classifier.

As shown in FIG. 4, when the optimal number of DPI engines is set to 1, a traffic path is redirected to pass through the DPI engine, thus resulting in an increase in network use. On the other hand, to minimize a network load, at least two DPI engines are distributed to each shortest path.

In a packet classified by a classifier, an SFC is specified through an SFC encapsulation function according to a necessary network service. In other words, SFC encapsulation includes information on an SFP in a packet, so that the SFP may be identified.

A service function forwarder (SFF) serves to forward a packet to a service function (SF) which is the corresponding network function along a path specified by an SFC encapsulation function.

The SFC technology is important in that it facilitates addition, update, etc. of a network function and reduces the load of network management. However, as described above, there are a problem of expandability caused by data traffic concentrated on SFC-related equipment, a problem of overhead caused by SFC encapsulation, and other problems, and a method for solving these problems is necessary.

When there are a relatively small number of deployed classifiers, bottlenecks of traffic entering the classifiers occur, and when several SFCs share one classifier, there is a probability that a roundabout path will be obtained due to the location of a selected classifier. Therefore, it is important to select optimal locations for classifiers and SFs with reference to SF sequences requested for generated traffic. Also, there is a demand for a technique of selecting an optimal path among SF instances for a requested SFC and forwarding traffic along an SFP without processing overhead for a service header.

Unlike an existing static method in which network functions are present on a data forwarding path and thus it is necessary to pass through all of the set network functions, the present invention intends to enable flexible service forwarding by dynamically controlling a traffic path so that data traffic may pass through a path on which network function instances required by the data traffic are present.

To enable such flexible service forwarding, the present invention proposes a distributed service function forwarding method to which a service network (SN) overlay structure is applied, thereby intending to support an automated network service.

Unlike existing network function providing methods, to enable flexible service forwarding through ordered connection of network functions required by the corresponding traffic and virtualization of the network functions in software, the present invention configures SNs of a network overlay structure in units of SFCs obtained by abstracting network functions necessary for a particular service and an application sequence of the network functions as shown in FIG. 1 and generates a service graph which is an SFP using an SN controller instance 100 which controls the network.

An SFP of traffic which has entered a network infrastructure is formed by selecting particular network function (SF) instances on particular physical nodes based on a requested SFC. In other words, an SFC is a technology for routing data packets to network functions (ordered SFs) which will be applied to the data packets.

According to the present invention, to resolve the bottleneck of traffic that may be caused according to the location of an SFC classifier on which data traffic to be analyzed for traffic classification and the number of instances, an SFC handling classifier function of mapping an SN capable of generating a service graph of an SFC requested for generated traffic to an SN controller instance is supported by a software defined network (SDN) infrastructure controller 200, and an SN controller instance 100 which controls overlaid SNs for supporting the corresponding SFC provides an SFP.

When there is an SN appropriate for an SFC requested by the corresponding traffic or a new SN is configured, the SDN infrastructure controller 200 of the present invention includes the corresponding SFC-identification (ID) tag in a request for an SFP of the corresponding traffic and transmits the request to an SN controller instance which controls the corresponding SN.

An SFC provided by a configured SN may configure several SFPs by selectively combining ordered logical SF components. An SN controller instance of the present invention transfers OpenFlow-based multiprotocol label switching (MPLS) push/pop flow rule information to the corresponding switches along an ordered SF path included in the corresponding SFC with reference to requested SF sequences, thereby forming a requested service graph.

To efficiently manage physical network resources and computing resources shared among a plurality of overlaid SNs, it is necessary to check the amount of resources used in the configured SNs and to determine and cope with a state of network load.

Figure 2:
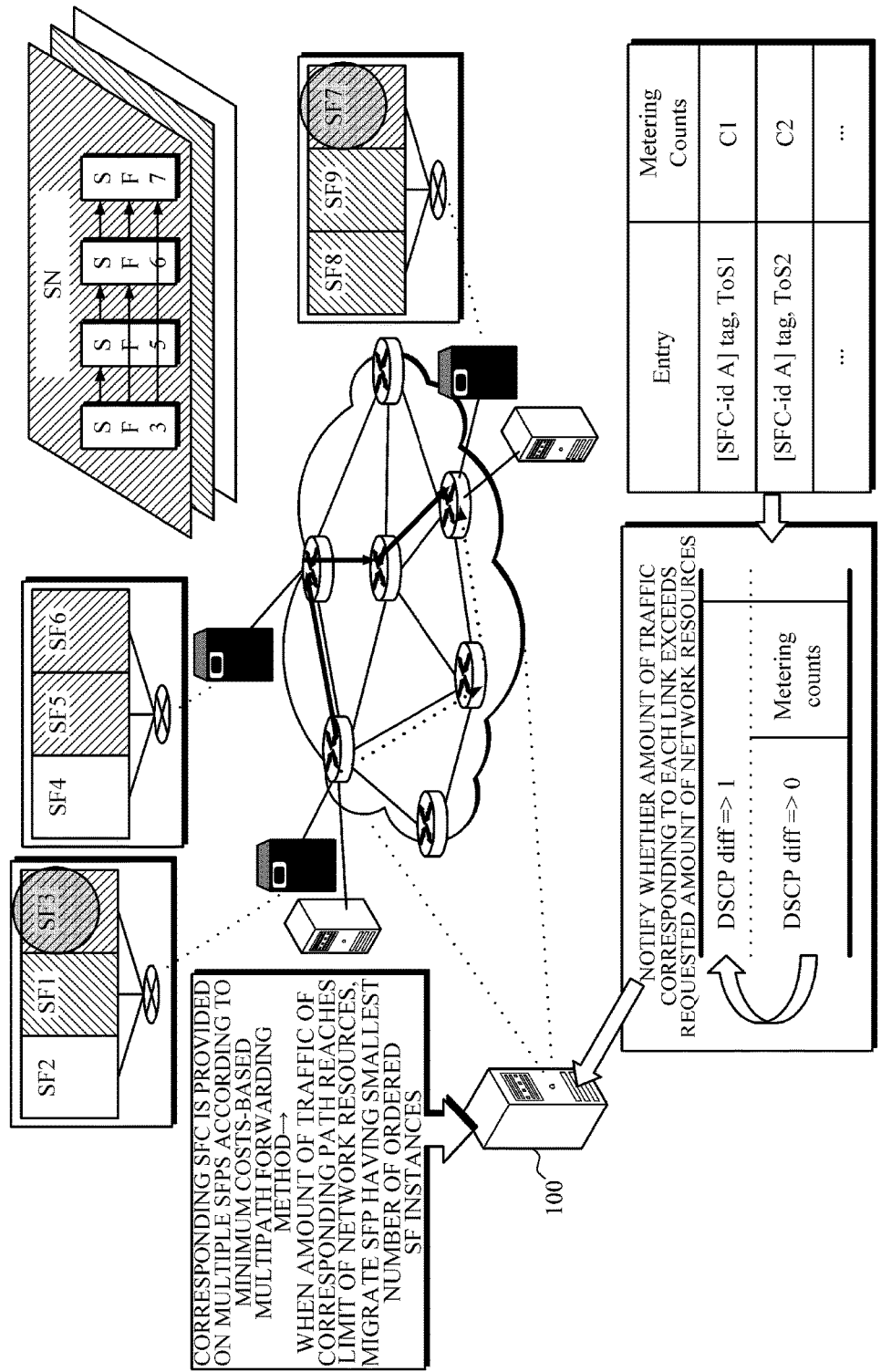
FIG. 2 is a diagram illustrating distribution of service function chain (SFC) paths according to traffic load of the distributed SF forwarding system of the present invention.

As shown in FIG. 2, to check the amount of network resources used for traffic generated on a service graph generated and managed by an SN, the present invention sets an OpenFlow-based meter table for every link of a physical network topology and checks the amount of network resources used for SN traffic according to links.

When it is recognized through a set meter table that the amount of traffic generated in the corresponding SN has exceeded a requested amount of network resources and an SN controller instance 100 is notified of that, the SN controller instance 100 distributes generated traffic load by resetting multiple SFPs for the corresponding SFC according to a multipath forwarding method based on minimum costs dependent on currently available network resources.

In the minimum costs-based multipath forwarding method applied to reset a path of a service graph according to an SFC of an SN, an SFP having the smallest number of SF instances constituting an ordered SFP is selected from among a plurality of SFPs, and a replacement path for the corresponding path or multiple paths are set, thereby distributing a part of generated traffic.

In other words, the corresponding SFC is provided on multiple SFPs according to the minimum costs-based multipath forwarding method. When the amount of traffic on the corresponding path reaches the limit of network resources, an SFP having a small number of ordered SF instances among multiple SFPs is migrated.

During a process of transmitting traffic generated on SFPs constituted by selectively combining ordered logical SF components of an SFC supported by an SN, processing overload may occur at a particular SF instance, or the SF instance may attain a failure state, and thus a requested SFP may not be supported.

Figure 3:
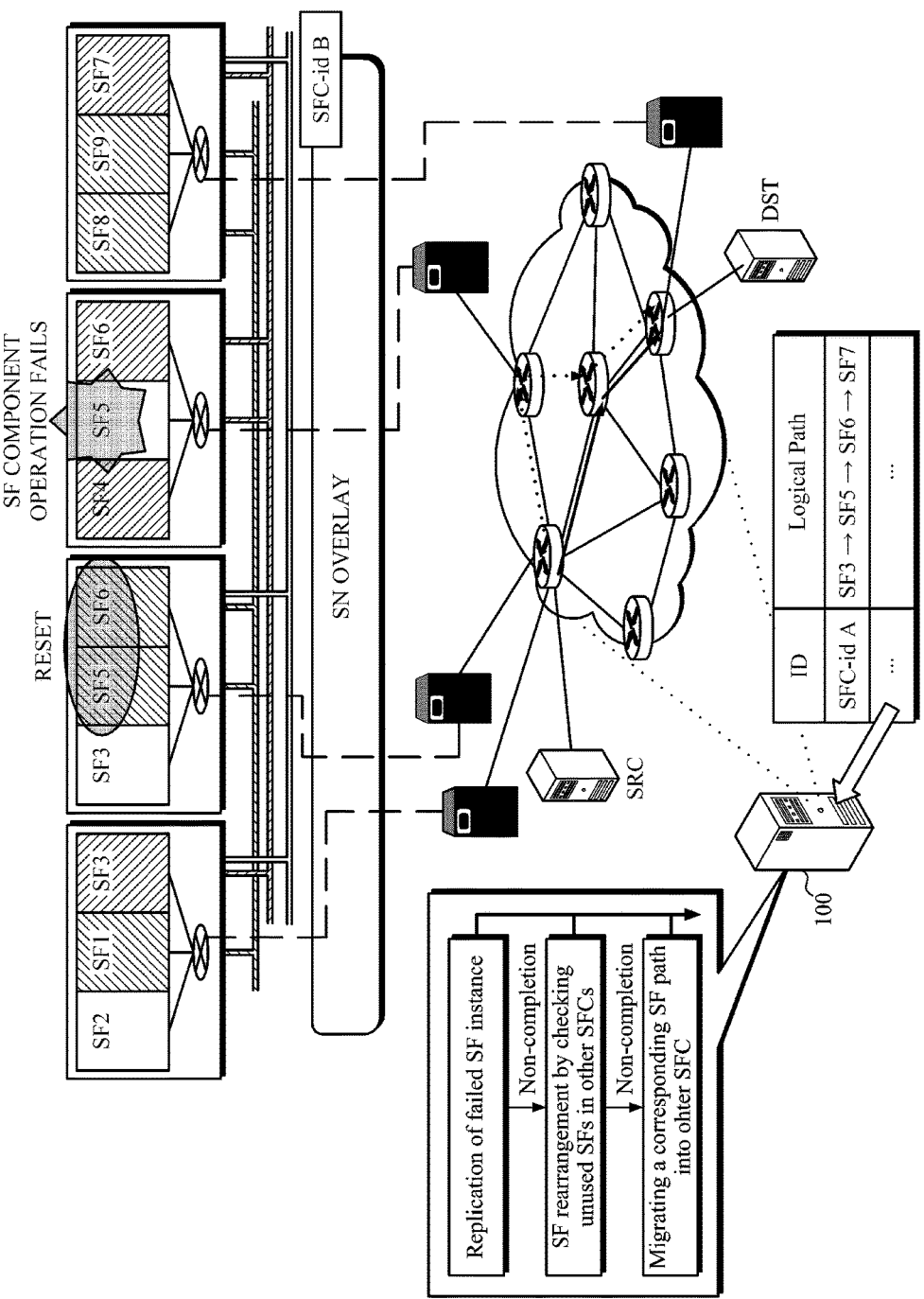
FIG. 3 is a diagram illustrating a method of setting a replacement SF and a replacement path for an SF failure state of the distributed SF forwarding system of the present invention.

In such an emergency situation, the present invention provides an uninterrupted SFP function by copying a candidate SF instance capable of replacing an SF instance which has been determined to be in a failure state, in consideration of currently available computing resources, as shown in FIG. 3.

When it is determined that it is difficult to copy the SF instance in the failure state, it is determined whether SF instances currently in a stop state among SF instances running for an SFC supported by another SN are of a type capable of replacing the failed SF, and an SF instance capable of replacing the failed SF is selected. Then, the corresponding SN configuration is adjusted to include the selected SF instance, so that the uninterrupted SFP function is supported.

The candidate instance for the failed SF is selected from among SF instances included in an SFC of another SN, in consideration of an increase in communication cost caused by a roundabout path of an SFP passing through the candidate SF instance.

During such a process, when it is determined that it is not possible to select a candidate SF instance, another SFC capable of supporting an SFP function related to the failed SF is selected after it is determined whether there are available network resources and computing resources besides the plurality of SFPs which are currently running.

According to the SN overlay-based SF forwarding technology of the present invention described above, an SFC classifier function for classifying generated traffic is provided by an SDN infrastructure controller and SN controller instances, thereby reducing a probability of a bottleneck of traffic entering an existing SFC classifier. Also, an SN and an SN controller instance for the corresponding SFC are mapped to each other, thereby generating and controlling a service topology independent of a physical network topology and a service graph of the SFC. Therefore, it is possible to distribute the load of generated traffic and the processing load of an SF, in consideration of network resources and computing resources, and support an SDN-based efficient SFC function.

The present invention proposes an SN overlay-based distributed SF forwarding method for timely configuring and controlling one SN by selectively combining and executing necessary network functions according to traffic, thereby solving a problem of overhead caused by SFC encapsulation and problems of a bottleneck and expandability caused by data traffic concentrated on an SFC classifier.

Also, according to the present invention, an SFC handling classifier function is provided by an SDN infrastructure controller and a plurality of SN controller instances, thereby preventing a bottleneck of traffic concentrated on a deployed SFC classifier. Also, an SN independent of a topology is configured, thereby generating and controlling an SDN-based service graph without processing overhead for a service header.

Further, according to the present invention, an SN and an SN controller instance for the corresponding SFC are mapped to each other, thereby generating and controlling a service topology independent of a physical network topology and a service graph of the SFC. Therefore, it is possible to distribute the load of generated traffic and the processing load of an SF, in consideration of network resources and computing resources, and to support an SDN-based efficient SFC function.

The present invention may be industrially used in the field of SF chaining technology and application fields thereof.

A number of examples have been described above. Nevertheless, it should be understood that various modifications may be made. For example, suitable results may be achieved if the described techniques are performed in different order and/or if components in the described system, architecture, device, or circuit are combined in a different manner and/or replaced or supplemented by other components or their equivalents. Accordingly, other implementations are within the scope of the following claims.

What is claimed is:
1. A distributed service function (SF) forwarding system comprising:
    a network controller configured with service network (SN) controller instances configured to control SNs of a network overlay structure in units of service function chains (SFCs) obtained by abstracting network functions necessary for a service and application sequences of the network functions, and generate service graphs which are service function paths (SFPs); and a software defined network (SDN) infrastructure controller including an SFC handling classifier function of mapping an SN capable of generating a service graph of an SFC requested for generated traffic to an SN controller instance to resolve a traffic bottleneck caused according to a location of an SFC classifier on which data traffic is concentrated and a number of instances, wherein when there is an SN appropriate for an SFC requested by traffic or a new SN is configured, the SDN infrastructure controller includes SFC-identification (ID) tag information in a request for an SFP of the traffic and transmits the request to an SN controller instance controlling a corresponding SN, and wherein when an amount of traffic generated in the SN exceeds a requested amount of network resources, the SN controller instance distributes a generated traffic load by resetting multiple SFPs for the SFC according to a multipath forwarding method based on minimum costs dependent on currently available network resources.

2. The distributed SF forwarding system of claim 1, wherein the SN controller instance configures several SFPs by selectively combining ordered logical SF components.

3. The distributed SF forwarding system of claim 2, wherein the SN controller instance generates the service graph according to an ordered SFP included in the SFC with reference to SF sequences.

4. The distributed SF forwarding system of claim 1, wherein, when resetting a path of the service graph according to the SFC of the SN, the SN controller instance applies the minimum costs-based multipath forwarding method, and distributes a part of generated traffic by selecting an SFP having a smallest number of SF instances constituting an ordered SFP from among a plurality of generated SFPs and setting a replacement path for the path or multiple paths.

5. The distributed SF forwarding system of claim 4, wherein, when a processing overload occurs at a particular SF instance or the SF instance attains a failure state and it is not possible to support the requested SFP during a process of transmitting traffic generated on the SFP constituted by selectively combining ordered logical SF components of the SFC supported by the SN, the SN controller instance provides an uninterrupted SFP function by copying a candidate SF instance capable of replacing the SF instance determined to be in the failure state, in consideration of currently available computing resources.

6. The distributed SF forwarding system of claim 5, wherein, when it is determined that it is difficult to copy the SF instance in the failure state, the SN controller instance determines whether SF instances currently in a stop state among SF instances running for an SFC supported by another SN are of a type capable of replacing a failed SF, and adjusts a configuration of the SN to include a candidate SF instance capable of replacing the failed SF.

7. The distributed SF forwarding system of claim 6, wherein the SN controller instance selects the candidate SF instance for the failed SF from among SF instances included in the SFC of the other SN, in consideration of an increase in communication cost caused by a roundabout path of an SFP passing through the candidate SF instance.

8. The distributed SF forwarding system of claim 7, wherein, when it is determined that it is not possible to select a candidate SF instance, the SN controller instance selects another SFC capable of supporting an SFP function related to the failed SF.

9. The distributed SF forwarding system of claim 8, wherein the SN controller instance selects the other SFC after determining whether there are available network resources and computing resources besides a plurality of SFPs currently running.

* * * * *